United States Patent Office 2,947,208
Patented Aug. 2, 1960

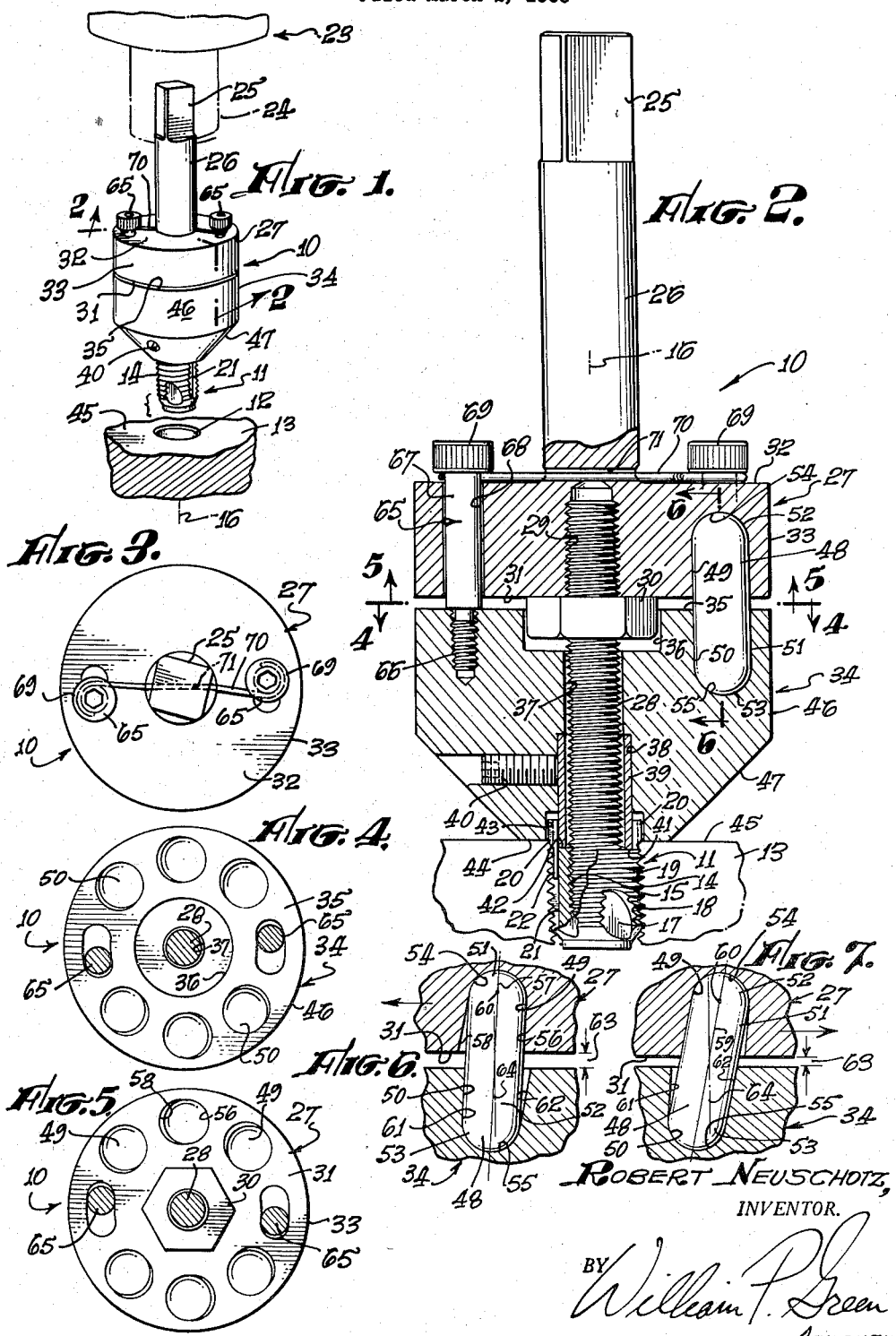

2,947,208

INSERT APPLYING TOOL

Robert Neuschotz, 1162 Angelo Drive,
Beverly Hills, Calif.

Filed Mar. 2, 1959, Ser. No. 796,546

16 Claims. (Cl. 81—53)

This invention relates to an improved type of tool for use in screwing a threaded insert into an opening in a carrier or body part. A tool embodying the invention is in certain respects particularly useful with inserts of the self-tapping type.

In screwing a self tapping insert into an opening by means of an applying tool, there is usually a tendency for the insert to become very tightly attached to the tool in a manner such that when the tool is subsequently turned in an unscrewing direction for withdrawal from the insert, the tool may tend to unscrew the insert itself from the opening. To prevent such unwanted withdrawal of the insert, there have in the past been devised certain insert applying tools consisting of two relatively movable sections which are intended to shift relative to one another after the insert has been fully screwed into position, and which function by that shifting movement to break the tight connection between the tool and the insert. However, the prior devices of this type with which I am familiar have all had disadvantages in use, usually resulting from the fact that they required the use of ball bearings or other parts in the device which could not effectively withstand the forces to which they were subjected in screwing an insert into place.

The general object of the present invention is to provide an improved tool for the above discussed purpose, which is capable of screwing an insert into an opening very effectively and positively and will then automatically release the tool for withdrawal from the insert, but in which the force transmitting parts can all be very heavy and strong and so designed as to almost indefinitely withstand the forces developed in use. A tool embodying the invention requires no ball bearings or other such relatively fragile force transmitting elements, and in addition attains an even more effective and rapid type of release between the tool and insert than has been attained in prior devices.

The tool includes a first section having a threaded shank onto which the insert is screwed, and a second section which bears axially against an end of the insert and is shiftable relative to the first section to release the insert from the tool. Forces are transmitted axially from the first section to the second through at least one (preferably several) specially designed elements which are adapted to swing relative to the two sections between two predetermined positions to control the relative axial positioning of the two sections. These elements, which may take the form of camming spacer pins interposed axially between the two sections, are adapted in response to initial unscrewing movement of the first of the sections to shift to positions in which the elements allow axial retracting movement of the second section relative to the first section and away from the insert, to rapidly and automatically break the tight connection between the tool and insert. The camming elements may interfit with the two sections in a relation enabling the elements themselves to transmit rotary movement between the two sections. This may be achieved by forming specially shaped socket recesses in the two sections into which opposite ends of the elements project.

The above and other features and objects of the present invention will be better understood from the following detailed description of the typical embodiment illustrated in the accompanying drawing in which:

Fig. 1 is a perspective view showing an insert applying tool constructed in accordance with the invention, and with an insert carried by the tool;

Fig. 2 is an enlarged axial section through the Fig. 1 tool, and taken on line 2—2 of Fig. 1;

Fig. 3 is a plan view of the tool;

Fig. 4 is a horizontal or transverse section taken on line 4—4 of Fig. 2;

Fig. 5 is a section taken on the same line as Fig. 4, but taken in the direction indicated by arrows 5—5 of Fig. 2;

Fig. 6 is a view taken on line 6—6 of Fig. 2, and showing one of the camming spacer pins as it appears during the screwing of an insert into an opening by the tool; and Fig. 7 is a view similar to Fig. 6, but showing the position of the camming pin during the unscrewing movement of the tool from the insert, after the insert has been screwed fully into its desired position within the opening.

Referring first to Fig. 1, I have represented generally at 10 a tool constructed in accordance with the invention, for screwing an insert 11 into an opening 12 formed in a part 13. The insert 11 is essentially tubular, having external threads 14 for engaging part 13, and having internal threads 15 (see Fig. 2) for engaging and holding a coacting stud after the insert has been screwed into its active position within part 13. The insert 11 may typically be a self-tapping type of insert, adapted to make its own threads in part 13 as the insert is screwed thereinto. In this event, the opening 12 may initially be merely a straight cylindrical bore, centered about an axis represented at 16. The opening 12 may either extend entirely through the thickness of part 13, or only partially through that part to form a blind recess, which type of recess is to be considered as an "opening" for the purposes of the present disclosure.

Insert 11 is rendered self-tapping by the formation of a plurality of circularly spaced cut away areas or interruptions 17 in the outer surface of the insert and through threads 14, to leave sharp leading edges of the threads at 18 (Fig. 2) adapted to cut threads 19 in part 13 as the insert is screwed into the opening. Insert 11 may also be of a type carrying one or more locking keys 20, which are received within individual axially extending grooves 21 formed in the outer threaded surface of insert 11, and which keys are initially frictionally retained in the grooves in the positions represented in Fig. 2, but are drivable axially inwardly (downwardly in Fig. 2) after the insert has been screwed to the Fig. 2 position, to deform the threads of part 13 in a manner locking or keying the insert against unscrewing movement. The axially inner portions 22 of keys 20 are of reduced radial extent, to avoid interference with the screwing of the insert 11 into its active position within part 13, and the grooves and keys are of suitable dove tail cross-sectional configuration to retain the keys in the grooves and permit only axial movement of the keys relative to insert 11. This key arrangement has been disclosed more fully and claimed in my Patent Number 2,855,970 issued October 14, 1958, and therefore will not be described in any further detail in the present application.

In use, tool 10 is held and operated by any conventional type of power operated press or other equipment which is capable of advancing the tool downwardly and simultaneously turning it about axis 16 at rates corresponding to the lead of insert threads 14, to thus screw the insert into part 13. This conventional operating press or other equipment is represented diagrammatically at 23, and includes a chuck 24 adapted to receive and tightly hold the upper non-circular portion 25 of an upper shank 26 of tool 10. Shank 26 is desirably centered about axis 16, the shank typically being externally cylindrical in shape, and with the upper portion 25 of the shank typically being of essentially square horizontal cross-section.

At its lower end, shank 26 has formed integrally therewith an enlarged diameter rigid flange 27 which carries and actuates a downwardly projecting externally threaded shank 28, whose threads correspond to internal threads 15 of insert 11, so that the insert can be screwed onto the lower end of shank 28 as shown. The shank 28 is centered about axis 16 of the device, and may be anchored to flange 27 by threaded reception within an axially extending threaded bore 29 formed in the flange, with a nut 30 on shank 28 being tightenable upwardly against undersurface 31 of flange 27 to rigidly secure shank 28 in fixed relation to flange 27. The undersurface 31 of flange 27, and its top surface 32, may both extend directly transversely of axis 16, with the outer surface 33 of this flange typically being cylindrical and centered about axis 16.

At a location beneath flange 27, tool 10 includes an annular rigid collar 34, disposed about threaded shank 28, and free for limited rotation relative thereto about axis 16. This part 34 has an upper surface 35 parallel to but spaced downwardly from surface 31 of flange 27, and interrupted at 36 to form a circular recess within which nut 30 is receivable. For passing shank 28 downwardly through part 34, the latter contains an axial bore 37 of a diameter slightly larger than shank 28, and having an increased diameter counterbore portion 38 within which there is mounted an externally and internally cylindrical rigid sleeve 39, tightly secured in fixed position within part 34 by a set screw 40. Sleeve 39 is of a diameter corresponding substantially to the diameter of insert 11, so that the lower annular horizontal or transverse surface 41 of sleeve 39 is capable of abutting annularly against the upper transverse surface 42 of insert 11, to apply downward force to the insert as it is screwed into part 13. About the lower end of sleeve 39, part 34 may contain a still larger diameter counterbore 43 shaped to receive the upper enlarged thickness ends of keys 20. Radially outwardly beyond this counterbore 43, part 34 has a downwardly facing annular transverse or horizontal surface 44 adapted to abut downwardly against upper surface 45 of part 13 to control the extent to which the insert is screwed into part 13. Externally, part 34 may have an upper cylindrical outer surface 46 of a diameter corresponding to, and aligned with, surface 33 of part 27, and beneath surface 46 part 34 may have a downwardly tapering frustro-conical surface 47.

For transmitting movement from upper part 26—27 to lower part 34, there are provided between these parts a series of circularly spaced camming spacer elements or pins 48. These pins 48 extend essentially vertically or axially of tool 10, with each pin having its upper and lower ends received within a pair of axially opposed socket recesses 49 and 50 formed within parts 27 and 34 respectively. Each pin may have an externally cylindrical side wall 51, with the opposite ends 52 and 53 of the pins being rounded convexly to a hemispherical shape, the centers of the hemispheres being located on the axis of cylindrical surface 51.

The inner or deepest portions of socket recesses 49 and 50 are preferably shaped to form substantially hemispherical concave surfaces 54 and 55, shaped in correspondence with surfaces 52 and 53 of the associated pins 48, so that the pin ends can nest within surfaces 54 and 55, and be confined thereby for swinging movement relative to parts 27 and 34 about the centers of the hemispherical surfaces. The side walls of socket recesses 49 and 50 are so shaped as to control and limit this swinging movement of pins 48 relative to parts 27 and 34, as is brought out best in Figs. 6 and 7. More particularly each of the upper recesses 49 has at its right side (as seen in Figs. 6 and 7) a side wall 56 which is of cylindrical curvature corresponding to surface 51 of pin 48, and which is centered about an axis 57. At its left side as seen in Figs. 6 and 7, recess 54 has a side wall 58, which is also of semi-cylindrical configuration corresponding to surface 51 of pin 48, but which is centered about a second axis 59, disposed at an angle to axis 57. These two axes 57 and 59 may intersect at the center 60 of the hemispherical surfaces 52 and 53. As will be apparent from Figs. 6 and 7, pin 48 is engageable in its two extreme positions with side wall 56 and 58 respectively, to in this way limit the swinging movement of the pin relative to flange 27.

The shape of each of the lower socket recesses 55 in part 34 may be identical with the upper recess 54, but inverted so that the left hand semi-cylindrical side wall 61 is centered about axis 57, while the right hand side wall 62 is centered about axis 59. The maximum radial dimension of each of the socket recesses 54 and 55 (radially of axis 16) is substantially the same as the diameter of pins 48, so that pins 48 do not allow any relative radial or transverse movement of parts 27 and 34, but instead allow only relative rotary movement of parts 27 and 34 about axis 16.

This relative rotation which is permitted between parts 27 and 34 is limited to a very few circular degrees. In the position in which part 27 has been turned as far as possible relative to part 34 in a clockwise direction, that is, the direction required for screwing shank 28 into insert 11, and for screwing insert 11 into part 13, the relative rotation is limited in the Fig. 6 position by engagement of each pin 48 with shoulders or side walls 56 and 61 of the two socket recesses within which the pin is received. The relative rotary movement of part 27 in the reverse or unscrewing direction is limited in the Fig. 7 position, by engagement of the pins with recess side walls 58 and 62. In the Fig. 6 condition, pins 48 act through their engagement with walls 56 and 61 to very positively transmit further right hand rotation from part 27 to part 34, whereas in the Fig. 7 position, the pins similarly transmit lefthand or unscrewing rotation between parts 27 and 34.

These pins and their mating recesses are so designed that the swinging movement of pins 48 from the Fig. 6 position to the Fig. 7 position allows part 34 to move axially closer to part 27, as represented by the reduction in the width of the spacing gap 63 in Fig. 7. For this purpose, the parts are designed so that the axis 59 of side walls 58 and 62 extends at a greater angle to the direction 64 in which axis 16 extends, than does the axis 57. The axis 59 may for example be disposed at an angle of say 10 degrees to the line 64, while the axis 57 may extend almost, but preferably not quite, parallel to direction line 64, the angle between axis 57 and line 64 typically being about one degree (see Fig. 6). Axis 57 being inclined to the same side of line 64 as is axis 59. Consequently, as the pin swings between the Fig. 6 and Fig. 7 positions, the pin axis never quite reaches the true axial line 64, so that the pin never reaches a center position in which there might be less freedom for movement of the parts between the Figs. 6 and 7 positions.

To retain part 34 against axial separation from part 26—27, there may be provided two axially extending parallel pins 65 having threaded ends 66 connected into part 34 at two diametrically opposite locations. Each of these pins 65 has a cylindrical portion 67 extending axially through an opening 68 formed in flange 27, with the two openings 68 being of sufficient extent circularly about axis 16 to allow the above discussed movement of flange 27 relative to part 34 between the positions of Figs. 6 and 7. At their upper ends, pins 65 have enlarged heads 69 which are too large to pass through passages 68, and thus effectively prevent separation of parts 27 and 34. Part 34 is normally yieldingly urged in an unscrewing or left hand rotary direction relative to part 26—27, and to the Fig. 6 relative position, by a spring 70, which extends along the upper side of flange 27 and through a transverse locating passage 71 in shank 26. The opposite ends of spring 70 are turned about portions 67 of pins 65 at the under side of heads 69, in a relation to urge part 34 to the Fig. 6 position as previously mentioned.

To describe one cycle of operation of the tool 10, assume first that the upper non-circular portion 25 of actuating shank 26 has been properly connected into chuck 24 of the actuating mechanism 23. Also assume that part 13 has been properly positioned with respect to tool 10 and actuating mechanism 23, so that the unthreaded cylindrical bore 12 in part 13 is directly opposite shank 28 of the tool. The next step is then to screw insert 11 onto the lower end of threaded shank 28 and to a position in which the end surface 42 of the insert engages end surface 41 of sleeve 39. At this time, part 34 is of course urged by spring 70 to the Fig. 6 position, in which pins 48 extend almost directly axially, and hold part 34 in an axially advanced position relative to flange 27. That is, the gap 63 between these parts is at a maximum. With the parts in this condition, mechanism 23 is energized to commence rotation of tool 10 in a right hand direction for screwing insert 11 into part 13, with the apparatus 23 acting to advance tool 10 and the insert axially or downwardly at a rate corresponding to the rate of advancement of threads 14, so that the insert is screwed into bore 12. The self-tapping portions 18 of the insert act to form the mating threads within bore 12 as the insert is screwed into position. During application of the insert, axial and rotary forces are transmitted from flange 27 to part 34 through pins 48, and axial forces are applied against the insert by part 39 which is carried by element 34.

When the apparatus reaches the Fig. 2 completely inserted position, in which end face 44 of part 34 engages element 13, driving mechanism 23 is reversed to commence a left hand or unscrewing rotation and corresponding axial withdrawing movement of part 26—27, in a manner to unscrew shank 28 from insert 11. The initial portion of this left hand rotation of flange 27 causes pins 48 to swing from their Fig. 6 positions to their Fig. 7 positions, to thus release part 34 for upward axial movement toward flange 27, so that the gap 63 may be reduced to the Fig. 7 condition. This releasing of part 34 for movement toward flange 27 releases element 39 from its tight engagement with the insert, so that part 34 can thereafter turn very freely with flange 27 to completely remove shank 28 from the insert, without any tendency for removal of the insert by virtue of the tight frictional engagement of part 39 with end face 42 of the insert body. After tool 10 has been completely removed from the insert, keys 20 may be driven axially inwardly to locally deform the material of part 13 and thereby lock the insert in fixed position within that part.

I claim:

1. A tool for screwing an insert into an opening comprising a first section adapted to be turned about a predetermined axis, a shank projecting from and turning with said first section and having external threads to be screwed into the insert, a second section adapted to be turned by said first section about said axis and free for limited relative rotary movement about said axis, means at the inner side of said second section positioned to abut axially inwardly against said insert, and an element for transmitting axially inward forces from the first section to the second section and movable relative to both sections between first and second positions in response to predetermined limited rotary movement of the first section relative to the second section in an unscrewing direction, said element in said first position being constructed to hold the second section in an axially advanced position relative to the first section, and said element in said second position being of reduced effective axial length to free the second section for axial retracting movement relative to the first section.

2. A tool as recited in claim 1, in which said second section is essentially annular and disposed about said shank.

3. A tool as recited in claim 1, in which there are a plurality of said elements at different locations about said axis for transmitting axial forces between the sections at those different locations.

4. A tool as recited in claim 1, including shoulders on said sections engageable with said element in a relation limiting said relative rotary movement of the sections and transmitting rotation therebetween.

5. A tool as recited in claim 1, including means yieldingly urging said second section rotatively relative to the first section in the rotary direction in which said shank threads are unscrewed from the insert.

6. A tool for screwing an insert into an opening comprising a first section adapted to be turned about a predetermined axis, a shank projecting from and turning with said first section and having external threads to be screwed into the insert, a second section adapted to be turned by said first section about said axis and free for limited relative rotary movement about said axis, means at the inner side of said second section positioned to abut axially inwardly against said insert, and a camming spacer element operatively interposed between said two sections at a location to transmit axially inward forces from the first section to the second and mounted to swing relative to both sections between first and second positions in response to predetermined limited rotary movement of the first section relative to the second section in an unscrewing direction, said element in said first position being constructed to hold the second section in an axially advanced position relative to the first section, and said element in said second position being of reduced effective axial spacing length to free the second section for axial retracting movement relative to the first section.

7. A tool as recited in claim 6, in which there are a series of said camming spacer elements operatively interposed between said sections at a series of different locations spaced about said axis.

8. A tool as recited in claim 6, in which said element has opposite end portions projecting axially into socket recesses formed in said two sections respectively to transmit forces therebetween, said ends of the element being loose fits in said sockets permitting movement of the element to positions of different angularity with respect to the sections to thereby vary the effective axial length of the element.

9. A tool as recited in claim 6, including yielding means urging said second section rotatively relative to said first section in the rotary direction in which said shank is unscrewed from the insert.

10. A tool for screwing an insert into an opening comprising a first section adapted to be turned about a predetermined axis, a shank projecting axially from and turning with said first section and having external threads to be screwed into the insert, a second section extending about said shank and adapted to be turned by the first section about said axis and free for limited relative rotary movement about the axis, said second section having a shoulder about said shank positioned to abut axially inwardly against an insert carried on the shank, a series of essentially axially extending camming spacing pins interposed between said two sections at locations spaced about said axis for transmitting axial and rotary forces therebetween, each of said pins having two oposite ends received within a pair of essentially axially opposed socket recesses formed in said two sections respectively, said pin ends being loose fits in said socket recesses allowing limited relative rotary movement of the two sections and allowing swinging of the pins to positions of increased angularity with respect to the direction in which said axis extends in response to limited rotary movement of the first section relative to the second section in an unscrewing direction to thereby allow a decrease in the axial spacing of the sections.

11. A tool as recited in claim 6, in which said element has opposite end portions projecting axially into socket recesses formed in said two sections respectively to transmit forces therebetween, said ends of the element being loose fits in said sockets permitting movement of the element to positions of different angularity with respect to the sections to thereby vary the effective axial length of the element, each of said sockets having two side walls at opposite sides of the socket disposed at two different angles with respect to the sections at a location to engage and stop the element in positions of different angularity and thereby limit the relative rotary movement of the sections.

12. A tool for screwing an insert into an opening comprising a first section adapted to be turned about a predetermined axis, a shank projecting axially from and turning with said first section and having external threads to be screwed into the insert, a second section extending about said shank and adapted to be turned by the first section about said axis and free for limited relative rotary movement about the axis, said second section having a shoulder about said shank positioned to abut axially inwardly against an insert carried on the shank, a series of essentially axially extending camming spacing pins interposed between said two sections at locations spaced about said axis for transmitting axial and rotary forces therebetween, each of said pins having two opposite ends received within a pair of essentially axially opposed socket recesses formed in said two sections respectively, said pin ends being loose fits in said socket recesses allowing limited relative rotary movement of the two sections and resultant swinging of the pins to positions of different angularity with respect to the two sections, said pins being constructed and located to swing to positions of increased angularity with respect to the direction in which said axis extends in response to limited rotary movement of the first section relative to the second section in an unscrewing direction to thereby allow a decrease in the axial spacing of the sections, each of said socket recesses having a pair of opposite side walls engageable with the associated pin to limit relative rotation of the sections.

13. A tool as recited in claim 12, in which said opposite side walls of each recess are disposed at different angles with respect to the direction in which said axis extends to engage and stop the pin in positions of different angularity.

14. A tool for screwing an insert into an opening comprising a first section adapted to be turned about a predetermined axis, a shank projecting axially from and turning with said first section and having external threads to be screwed into the insert, a second section extending about said shank and adapted to be turned by the first section about said axis and free for limited relative rotary movement about the axis, said second section having a shoulder about said shank positioned to abut axially inwardly against an insert carried on the shank, a series of essentially axially extending camming spacing pins interposed between said two sections at locations spaced about said axis for transmitting axial and rotary forces therebetween, each of said pins having two opposite ends received within a pair of essentially axially opposed socket recesses formed in said two sections respectively, said pin ends being loose fits in said socket recesses allowing limited relative rotary movement of the two sections and resultant swinging of the pins to positions of different angularity with respect to the two sections, said pins being constructed and located to swing to positions of increased angularity with respect to the direction in which said axis extends in response to limited rotary movement of the first section relative to the second section in an unscrewing direction to thereby allow a decrease in the axial spacing of the sections, each of said pins having two convex essentially hemispherical ends bearing in opposite axial directions against essentially hemispherical seats in the socket recesses, each pin being externally essentially cylindrical between said hemispherical ends, said socket recesses having essentially cylindrically curved opposite side walls engageable with said cylindrical portion of the pin and disposed at two different angles with respect to the direction in which said axis extends to limit relative rotary movement of the sections in opposite directions with the pins disposed at two different angles respectively to the direction of said axis.

15. A tool as recited in claim 14, including a spring yieldingly urging said second section rotatively relative to the first section in the rotary direction in which said shank is unscrewed from the insert.

16. A tool for screwing an insert into an opening comprising a first section adapted to be turned about a predetermined axis, a shank projecting axially from and turning with said first section and having external threads to be screwed into the insert, a second section extending about said shank and adapted to be turned by the first section about said axis and free for limited relative rotary movement about the axis, said second section having a shoulder about said shank positioned to abut axially inwardly against an insert carried on the shank, a series of essentially axially extending camming spacing pins interposed between said two sections at locations spaced about said axis for transmitting axial and rotary forces therebetween, each of said pins having two opposite ends received within a pair of essentially axially opposed socket recesses formed in said two sections respectively, said pin ends being loose fits in said socket recesses allowing limited relative rotary movement of the two sections and resultant swinging of the pins to positions of different angularity with respect to the two sections, said pins being constructed and located to swing to positions of increased angularity with respect to the direction in which said axis extends in response to limited rotary movement of the first section relative to the second section in an unscrewing direction to thereby allow a decrease in the axial spacing of the sections, said first section including a flange projecting radially outwardly from and about said axis and having said socket recesses formed at one axial side thereof, there being at least one retaining element projecting axially from said second section through an opening in said flange and having a head at the second axial side of the flange retaining the sections against axial separation, and a spring engaging said first section and said retaining element at said second axial side of the flange and yieldingly urging said second section rotatively relative to said first section in the rotary direction in which said shank is unscrewed from an insert.

References Cited in the file of this patent

UNITED STATES PATENTS

| | | |
|---|---|---|
| 1,232,806 | Johnson | July 10, 1917 |
| 2,641,948 | Braendel | June 16, 1953 |
| 2,704,473 | Walther | Mar. 22, 1955 |
| 2,795,159 | Sope | June 11, 1957 |

FOREIGN PATENTS

| | | |
|---|---|---|
| 13,979 | Great Britain | of 1909 |
| 344,303 | Germany | Nov. 17, 1921 |